US011713106B2

(12) United States Patent
Antunes

(10) Patent No.: US 11,713,106 B2
(45) Date of Patent: Aug. 1, 2023

(54) ARTICULATED COVER ASSEMBLY FOR WING LEADING EDGE SLAT TELESCOPIC TUBE DUCT

(71) Applicant: EMBRAER S.A., São José dos Campos (BR)

(72) Inventor: Marco Antonio Antunes, São José dos Campos (BR)

(73) Assignee: EMBRAER S.A., São José dos Campos (BR)

( * ) Notice: Subject to any disclaimer, the term of this patent is extended or adjusted under 35 U.S.C. 154(b) by 794 days.

(21) Appl. No.: 16/816,589

(22) Filed: Mar. 12, 2020

(65) Prior Publication Data

US 2020/0307765 A1    Oct. 1, 2020

Related U.S. Application Data

(60) Provisional application No. 62/823,829, filed on Mar. 26, 2019.

(51) Int. Cl.
*B64C 7/00* (2006.01)
*B64C 9/24* (2006.01)
*B64D 15/04* (2006.01)

(52) U.S. Cl.
CPC ............ *B64C 7/00* (2013.01); *B64C 9/24* (2013.01); *B64D 15/04* (2013.01)

(58) Field of Classification Search
CPC ..... B64C 9/22; B64C 9/24; B64C 9/26; B64C 9/02; B64C 7/00; B64D 15/04
See application file for complete search history.

(56) References Cited

U.S. PATENT DOCUMENTS

| | | | | |
|---|---|---|---|---|
| 4,640,477 A | * | 2/1987 | Pace ......................... | B64C 9/22 244/214 |
| 6,015,117 A | * | 1/2000 | Broadbent ................ | B64C 9/22 244/214 |
| 9,242,718 B2 | * | 1/2016 | Wilson ...................... | B64C 9/22 |
| 10,899,430 B2 | * | 1/2021 | Gallien ..................... | B64C 9/22 |
| 11,192,625 B2 | * | 12/2021 | Poloni ...................... | B64C 7/00 |
| 11,312,473 B2 | * | 4/2022 | Dovey ...................... | B64C 9/22 |

* cited by examiner

*Primary Examiner* — Richard Green
(74) *Attorney, Agent, or Firm* — Nixon & Vanderhye P.C.

(57) ABSTRACT

An aircraft wing is provided having a wing leading edge, a cut-out opening in the wing leading edge, a telescopic tube extending through the cut-out opening and connected to an internal duct of a wing leading edge slat to establish fluid communication with heated air associated with an aircraft anti-icing system, wherein the telescopic tube is moveable between retracted and extended conditions in response to the wing leading edge slat being moved between slat retraction and deployment positions, respectively, and a cover assembly comprising a cover member operatively connected to the telescopic tube to close the cut-out opening and allow synchronous movement of the cover member with the telescopic tube in response to the telescopic tube being moved between the retracted and extended conditions thereof.

15 Claims, 8 Drawing Sheets

ARTICULATED COVER ASSEMBLY FOR WING LEADING EDGE SLAT TELESCOPIC TUBE DUCT

CROSS-REFERENCE TO RELATED APPLICATION

This application is based on and claims domestic priority benefits of U.S. Provisional Application Ser. No. 62/823,829 filed on Mar. 26, 2019, and may be deemed relevant to U.S. patent application Ser. No. 16/816,464 filed on Mar. 12, 2020 herewith entitled "Shuttering Mechanism for Wing Slat Telescopic Tube Duct" (now U.S. Pat. No. 11,242,130), the entire contents of each of which are expressly incorporated hereinto by reference.

FIELD

The embodiments disclosed herein relate generally to an aircraft wing provided with a leading edge wing slat. More specifically, the embodiments disclosed herein relate to a cover assembly for a cut-out opening in a wing leading edge that is capable of synchronous articulated movements during operation of a telescopic tube duct.

BACKGROUND

Wing leading edge slats are conventionally connected to a telescopic tube duct that provides a path for heated air (e.g., typically engine bleed air) as part of the leading edge slat anti-icing system. A cut-out opening is provided in the leading edge skin of the wing to accommodate the positioning of the telescopic duct and allow it to be moved between retracted and extended conditions concurrently with the retraction and deployment of the wing leading edge slat, respectively.

However, when the leading edge wing slat is deployed, it will expose the cut-out opening to the oncoming incident airflow thereby potentially impacting aerodynamic performance of the slat and/or wing. It would therefore be highly desirable if the cut-out opening could be covered by a shuttering mechanism when the leading wing edge slat is deployed so as to minimize (if not alleviate entirely) adverse aerodynamic performance impacts. It is towards providing such solutions that the embodiments disclosed herein are directed.

SUMMARY

Generally, the embodiments disclosed herein are directed toward a cover assembly whereby the cut-out opening in the wing leading edge skin associated with the telescopic tube duct for a leading edge slat is covered when the leading edge slat is deployed. According to some embodiments disclosed herein, an aircraft wing is provided which comprises a wing leading edge, a cut-out opening in the wing leading edge, a telescopic tube extendable through the cut-out opening and connected to an internal duct of a wing leading edge to establish fluid communication with heated air associated with an aircraft anti-icing system, wherein the telescopic tube is moveable between retracted and extended conditions in response to the wing leading edge slat being moved between slat retraction and deployment positions, respectively, and a cover assembly to cover the cut-out opening in the wing leading edge. The cover assembly may include a cover member operatively connected to the telescopic tube to close the cut-out opening and allow synchronous movement of the cover member with the telescopic tube in response to the telescopic tube being moved between the retracted and extended conditions thereof.

According to certain embodiments the cover member may be convexly curved and include an opposed pair of side plates. A connection yoke may be provided to establish articulated connection between the cover member and the telescopic tube. The connection yoke in some embodiments will be a generally inverted U-shaped structure having a pair of downwardly and outwardly extending side arms and a central support plate. Each of the side arms may thus be fixed to a respective side portion of the telescopic tube, while the central support plate may be connected to the cover member to allow rotational articulation about a generally vertical axis.

The cover member may comprise a connection bracket which includes a substantially horizontally oriented central connection boss, while the connection yoke may comprise a central bushing and pin assembly to operatively interconnect the central support plate to the central connection boss and thereby allow rotational articulation of the cover member about the generally vertical axis defined by the bushing and pin assembly. Some embodiments of the connection bracket will include a spaced apart pair of substantially vertically oriented lateral connection bosses, while the connection yoke comprises a pair of lateral bushing and pin assemblies The articulated movements of the cover member will thereby achieve three freedoms of movement relative to two mutually perpendicular axes to thereby ensure that the cover member will be capable of synchronous movement with the telescopic tube during use (e.g., lateral movement and/or angular deflection of the telescopic tube due to wind shear in use, deflection of the tube support as well as axial telescopic movement of the tube).

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
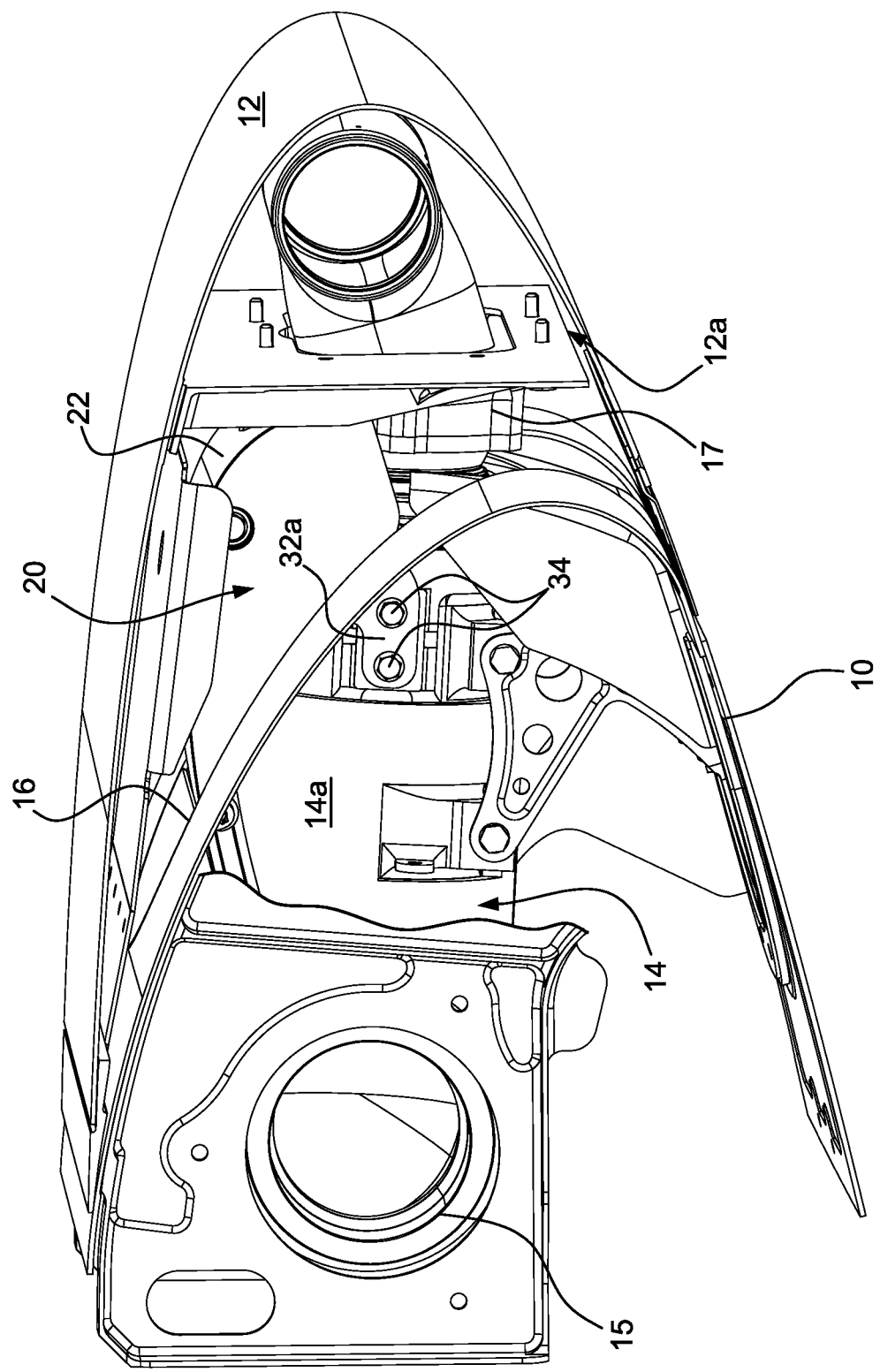
FIG. 1 is a perspective sectional view of an aircraft wing leading edge and associated leading edge slat depicting an embodiment of the cover assembly connected for articulated movement with the leading edge slat telescopic tube duct as described herein and showing the telescopic tube duct in a retracted condition.
Figure 2:
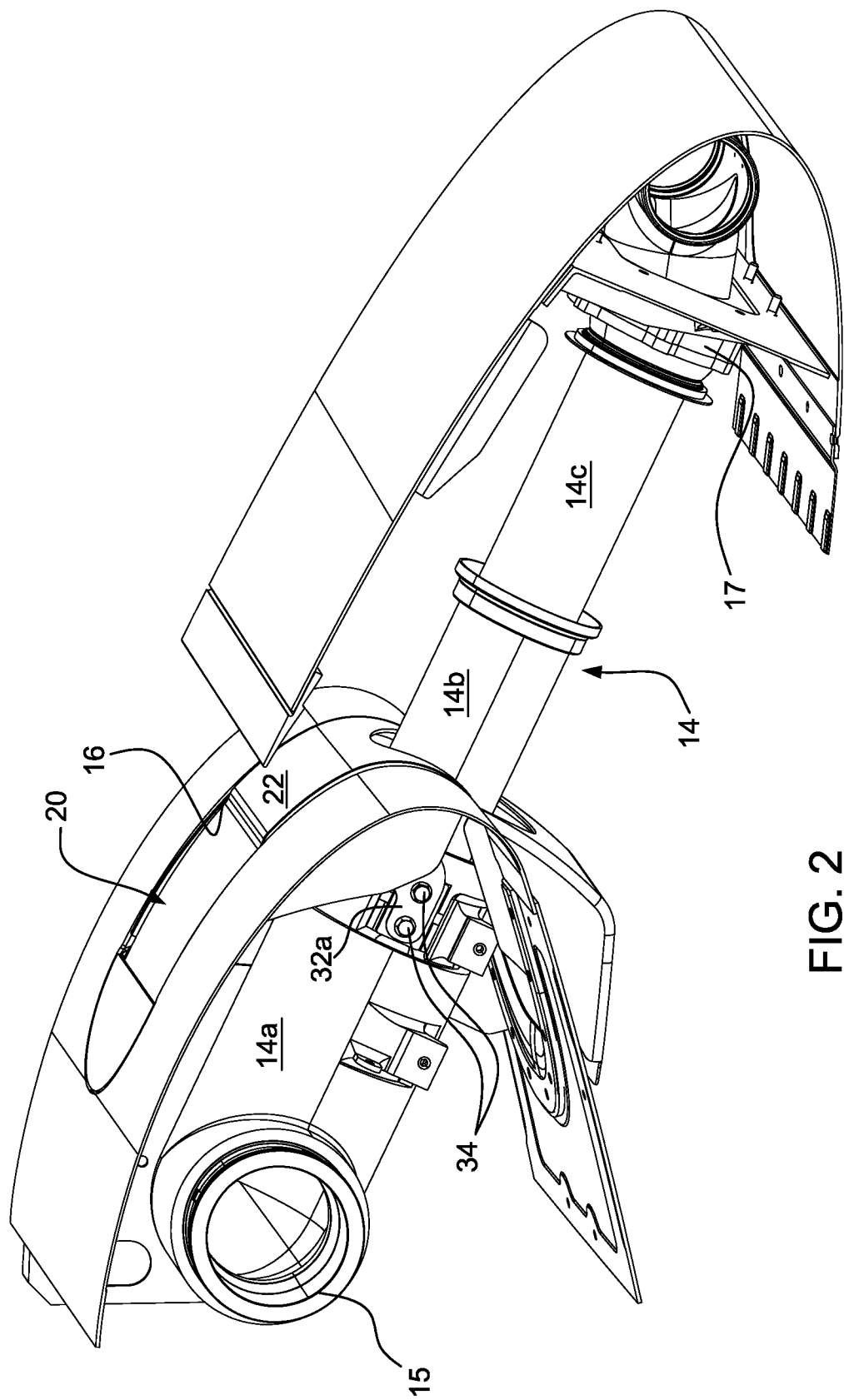
FIG. 2 is a perspective sectional view of an aircraft wing leading edge and associated leading edge slat similar to FIG. 1 but showing the telescopic tube duct in an extended condition.

Accompanying FIGS. 1-2 depict an aircraft wing leading edge 10 and associated leading edge slat 12 that are conventionally employed in transport category aircraft. The leading edge slat 12 is provided with an internal duct space 12a extending in the span-wise direction of the slat 12 to receive heated air (e.g., engine bleed air) from a telescopic duct 14 associated with the aircraft's anti-icing system and positioned within a cut-out opening 16 in the wing leading edge skin. As is conventional, the telescopic duct 14 includes a spanwise support duct 15 which serves to supply heated air from a source (e.g., engine bleed air) to the telescopic duct 14. Also conventional, the telescopic duct 14 includes a proximal base duct section 14a which is non-extensible but rotatable about the axis of the support duct 15 and a series of telescopically nested duct sections 14b and 14c, the latter being fluid connected to the leading edge duct 12a via a forward connection flange 17.

Figure 4:
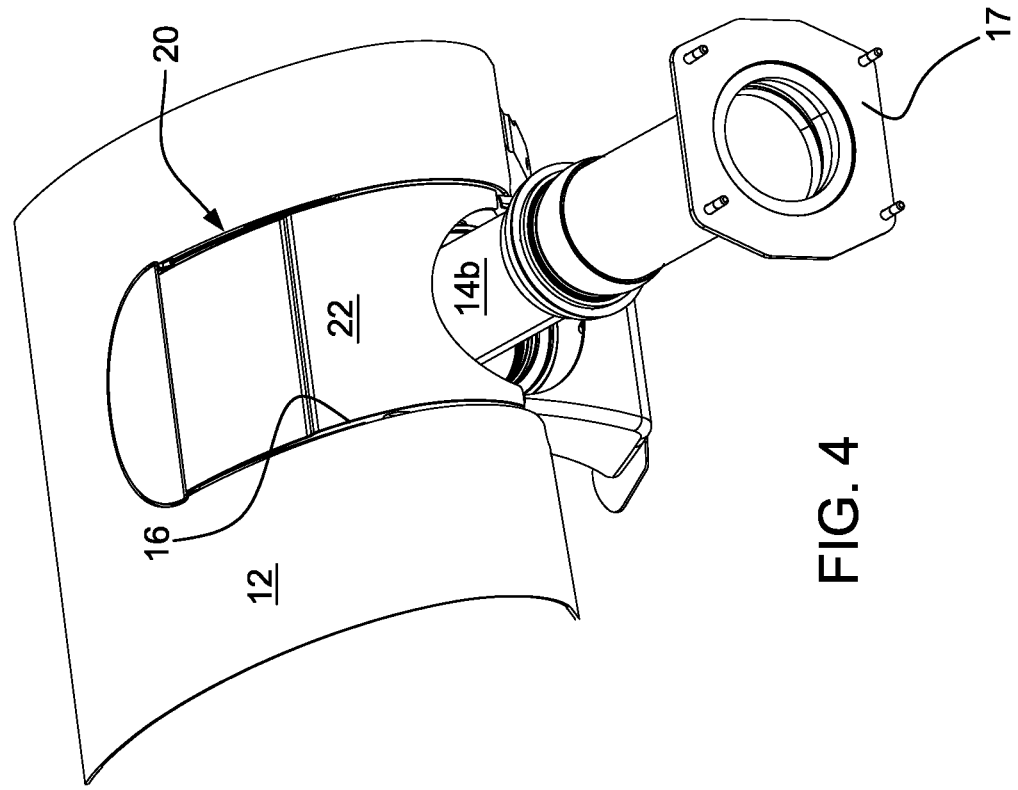
FIG. 4 is a front perspective view similar to FIG. 3 but showing the telescopic tube duct in an extended condition.
Figure 3:
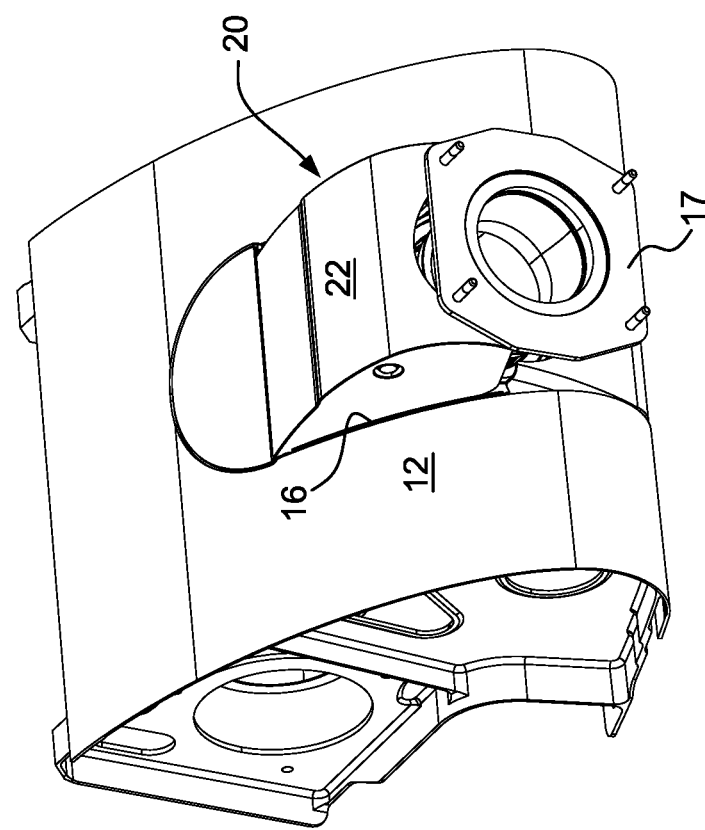
FIG. 3 is a front perspective view of an aircraft wing leading edge and associated cut-out therein showing a telescopic tube duct in a retracted condition and a cover assembly in accordance with an embodiment of the invention synchronously connected thereto whereby the leading edge slat has been omitted for clarity of presentation.
Figure 5:
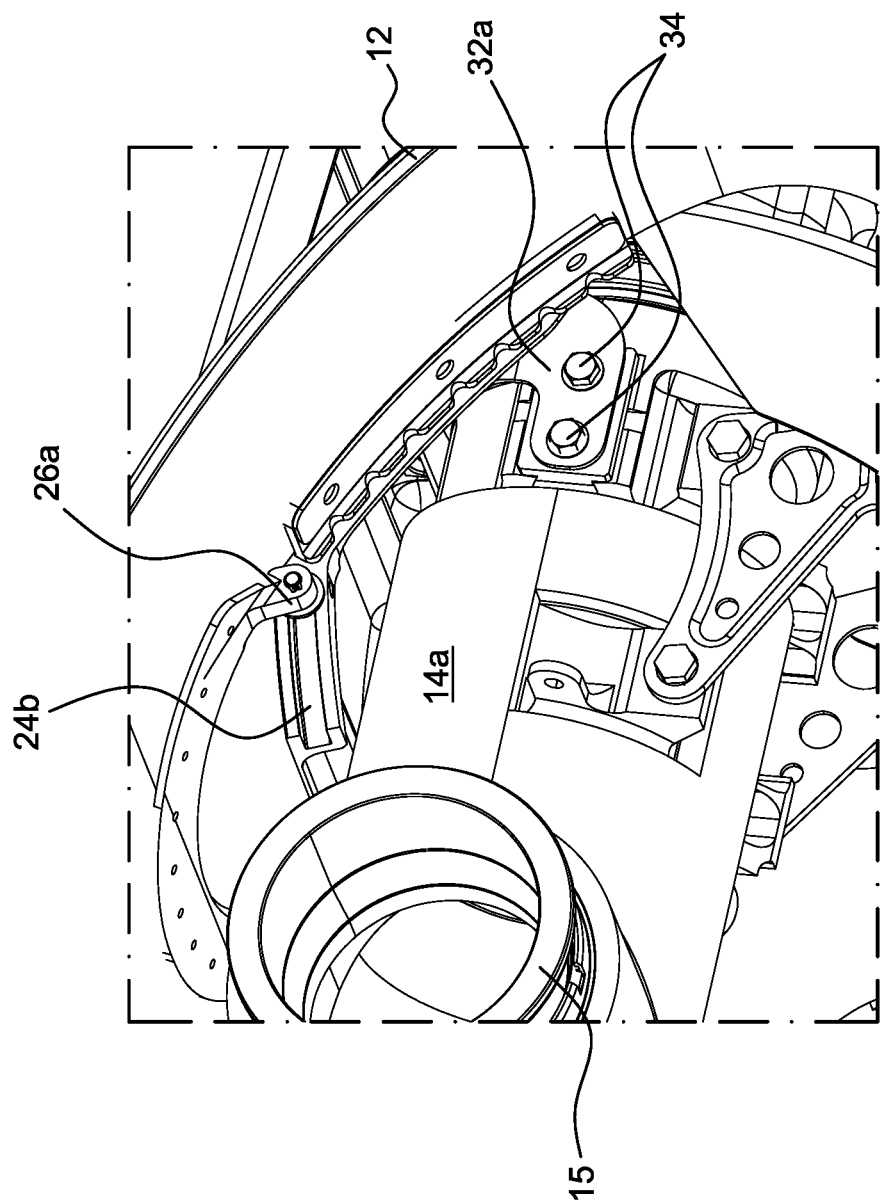
FIG. 5 is a perspective view internally of the wing leading edge showing the telescopic tube duct and associated cover assembly in accordance with an embodiment of the invention with the telescopic tube duct in a retracted condition.
Figure 6:
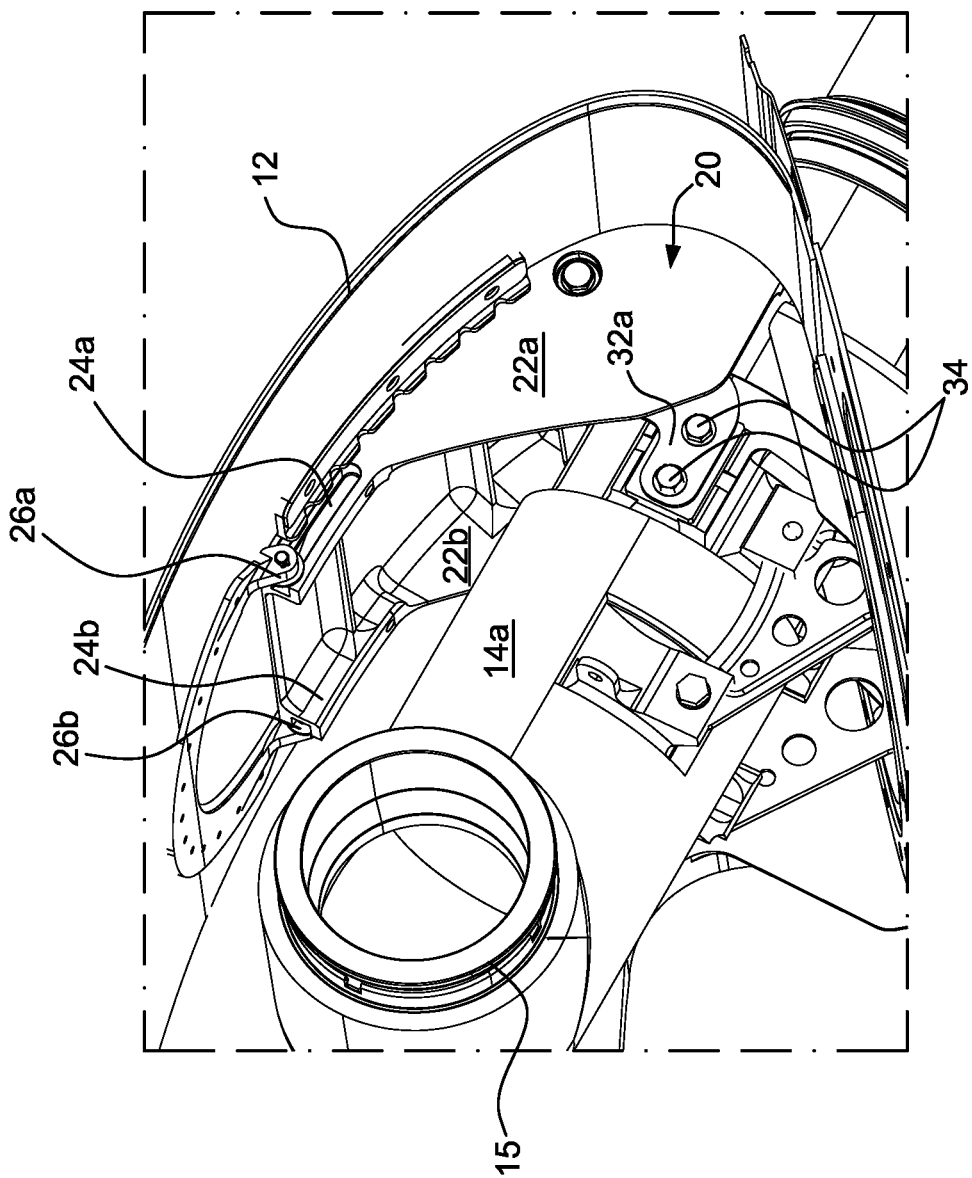
FIG. 6 is a perspective view internally of the wing leading edge similar to FIG. 5 but showing the telescopic tube duct in an extended condition.
Figure 7:
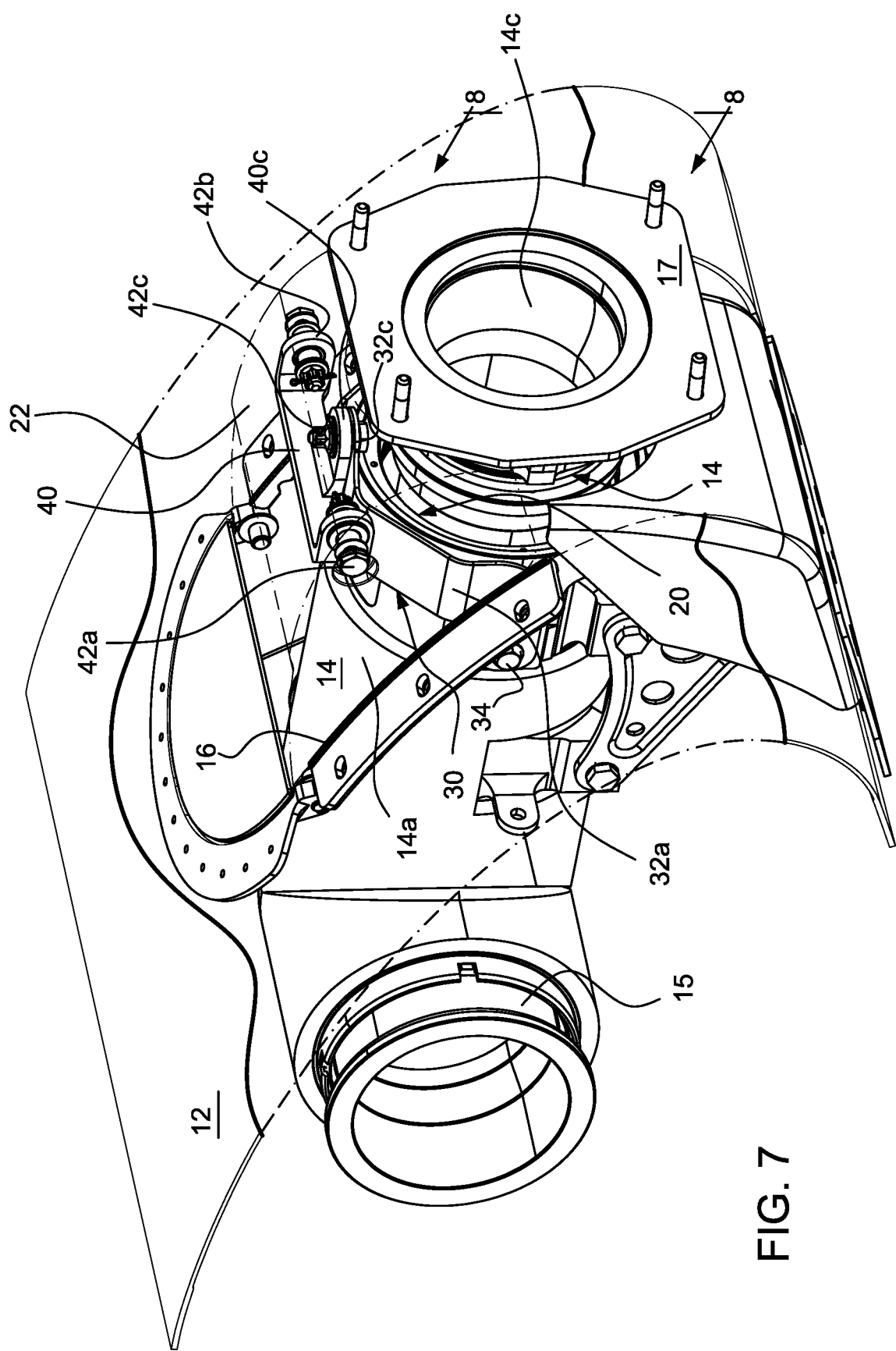
FIG. 7 is a perspective view externally of the wing leading edge showing the telescopic tube duct and associated cover assembly in accordance with an embodiment of the invention with the telescopic tube duct in a retracted condition.
Figure 8:
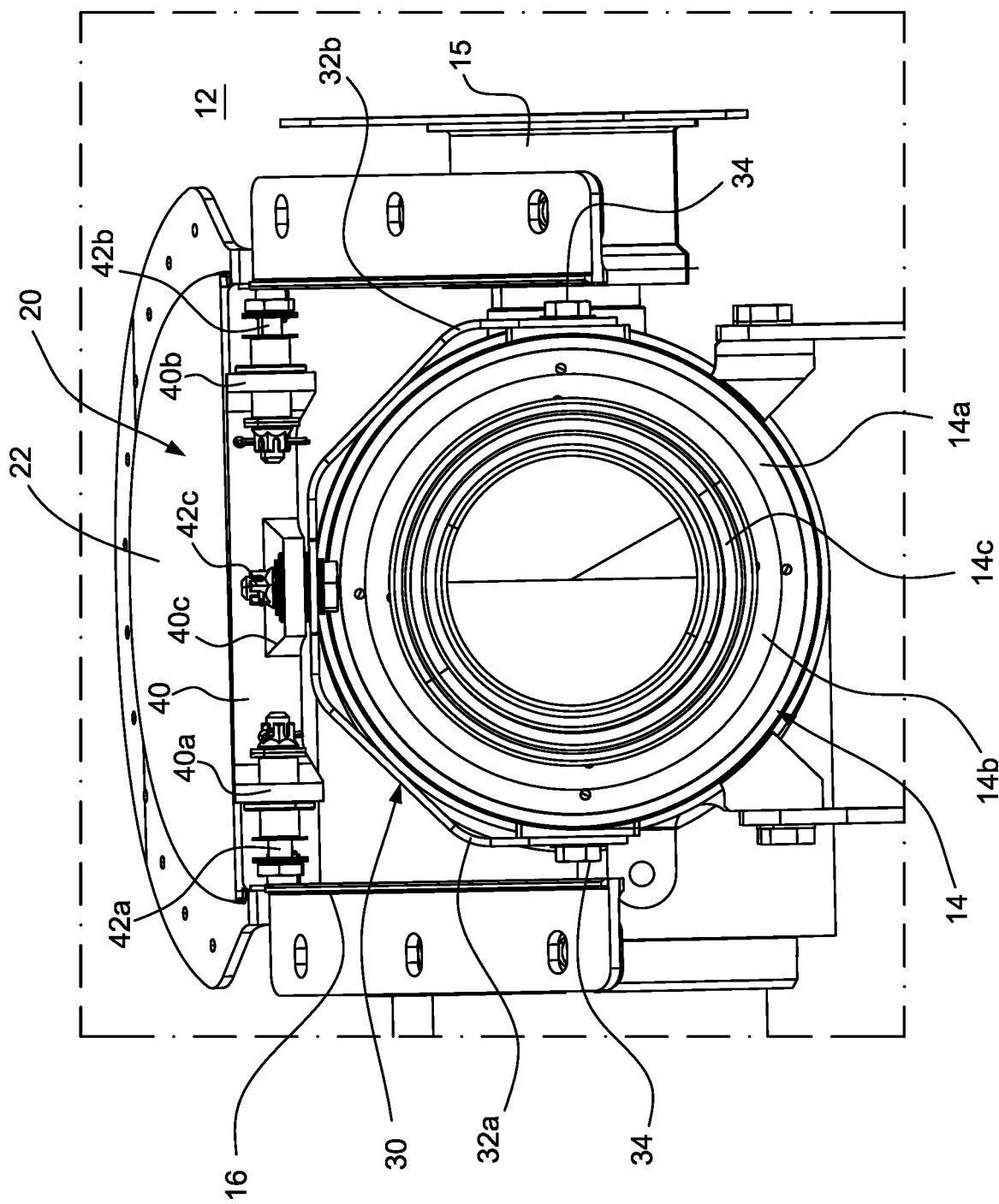
FIG. 8 is a front elevational view of the telescopic tube duct and associated cover assembly in accordance with an embodiment of the invention as taken along line 8-8 in FIG. 5.
Figure 9:
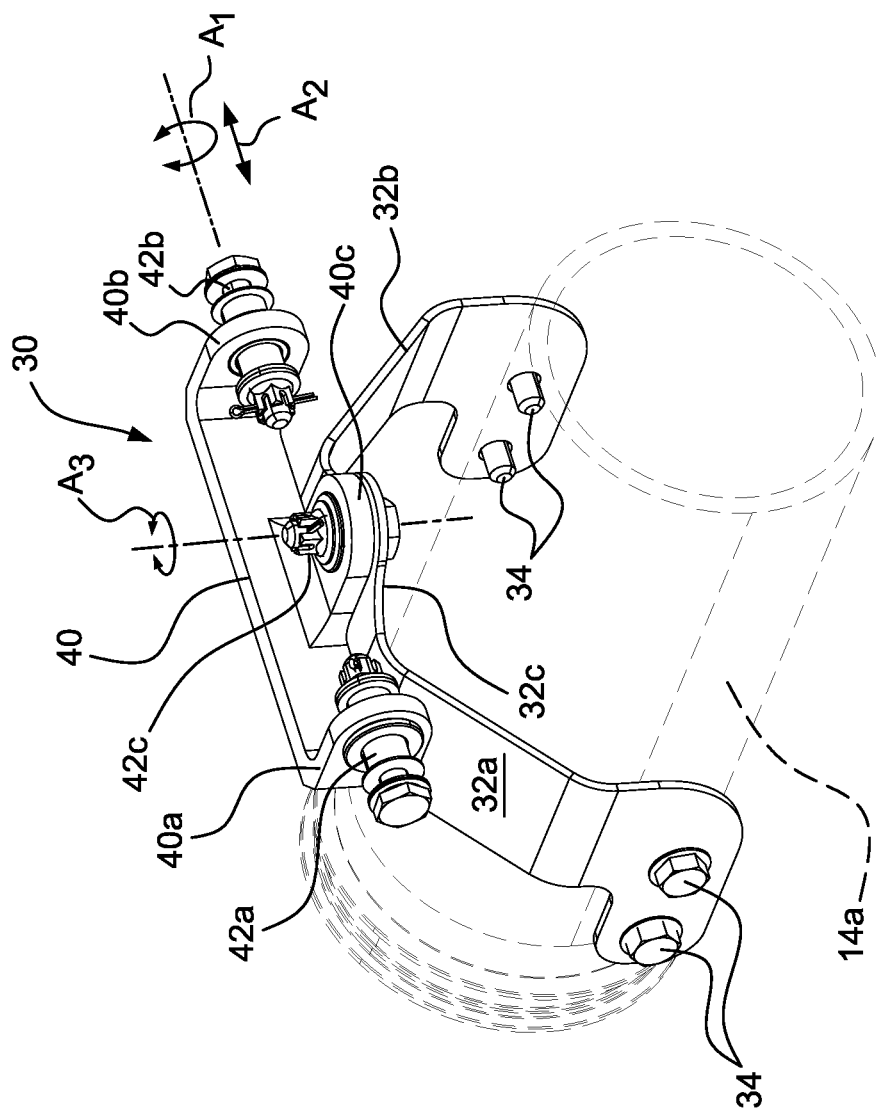
FIG. 9 is a detailed enlarged perspective view of the connection yoke to provide articulated connection between the telescopic tube duct and the cover member.

In order to cover the cut-out opening 16 when the leading edge slat 12 is deployed thereby necessitating moving the telescopic duct 14 from the retracted condition (as shown in FIGS. 1, 3 and 5) into an extended condition (as shown in FIGS. 2, 4 and 6), a cover assembly 20 in accordance with an embodiment of the present invention is provided so as to be synchronously operable with such movement of the telescopic duct 14. The telescopic tube duct 14 will telescopically extend outwardly and downwardly (i.e., will rotate downwardly about the axis of the supply tube 15) in response to outward and downward deployment of the wing leading edge slat 12. Since the wing leading edge slat 12 deploys downwardly and outwardly, the cut-out opening 16 in the wing leading edge skin will be exposed to a maximum extent as compared to the retracted position of the telescopic tube duct 14. In order to minimize the aerodynamic impacts of such exposure of the cut-out opening 16, the cover assembly 20 is provided with a convexly arcuately curved cover door 22 that is synchronously connected to the proximal tube section 14a for articulated movement therewith as will be explained in greater detail below.

More specifically, as is perhaps best shown in FIGS. 5-9, the curved cover door 22 includes a spaced apart pair of opposed side support plates 22a, 22b. A proximal end of the side support plates 22a, 22b further defines elongate guide channels 24a, 24b which receive therein respective rollers 26a, 26b that are in a fixed position relative to the wing leading edge 12 (see FIG. 6). Thus, as the telescopic tube 14 moves outwardly and downwardly during movement to the extended condition thereof, the proximal end of the side plates 26a, 26b will be allowed to move relative to the rollers 24a, 24b by virtue of each of the rollers 24a, 24b being moveably positioned within the guide channels 26a, 26b. Thus, the proximal end of the side plates 26a, 26b will move such that the rollers 24a, 24b are positioned at a forward end of the guide channels 26a, 26b when the telescopic tube 14 is in the retracted condition (e.g., as shown in FIG. 5) to a position at the rearward end of the guide channels 26a, 26b when the telescopic tube is in an extended condition (e.g., as shown in FIG. 6).

In order to synchronize movement of the cover member 22 with the telescopic tube 14, a connection yoke 30 is provided to establish articulated connection between the side plates 24a, 24b of the cover member 22 to the tube section 14a of the telescopic tube 14. As is perhaps best seen in the enlarged view of FIG. 9, the connection yoke 30 is generally an inverted U-shaped structure which includes side arms 32a, 32b extending downwardly and outwardly from a central support plate 32c. Each of the lower ends of the side arms 32a, 32b is fixed to a respective exterior side of the tube section 14a (e.g., by means of attachment bolts 34).

The cover member 22 is provided with a fixed position bracket 40 that spans the distance between the side plates 22a, 22b thereof. The bracket 40 includes a pair of laterally spaced apart vertically oriented connection bosses 40a, 40b and a horizontally oriented central connection boss 40c. Each of the bosses 40a, 40b and 40c is provided with a respective bushing and pin assemblies 42a, 42b and 42c. The coaxially aligned bushing and pin assemblies 42a and 42b connect the cover member 22 so as to allow the cover member 22 to be capable of reciprocal articulated movement both rotationally and linearly in a lateral direction during movement of the tube section 14a relative to the generally horizontal axis Y of the coaxially aligned connection pins 42a and 42b (e.g., as shown by arrows A1 and A2 in FIG. 9). The connection bushing and pin assembly 42c on the other hand joins the cover member 22 to the tube section 14a through the connection yoke 30 so as to allow relative reciprocal rotational articulation about the generally vertical axis X of the connection pin assembly 42c (e.g., as shown by arrow A3 in FIG. 9). Such articulated movements of the cover member 22 thereby achieves three freedoms of movement depicted by arrows A1, A2 and A3 relative to the mutually perpendicular axes X and Y and thereby ensures that the cover member 22 will be capable of synchronous movement with the telescopic tube 14 during use (e.g., lateral movement and/or angular deflection of the tube sections 14b, 14c due to wind shear in use, deflection of the support 15 as well as axial telescopic movement of the tube 14).

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. An aircraft wing comprising:
   a wing leading edge;
   a cut-out opening in the wing leading edge;
   a telescopic tube extendable through the cut-out opening and connected to an internal duct of the wing leading edge to establish fluid communication with heated air associated with an aircraft anti-icing system, wherein the telescopic tube is moveable between retracted and extended conditions in response to a wing leading edge slat being moved between slat retraction and deployment positions, respectively;

a cover assembly comprising a cover member operatively connected to the telescopic tube to close the cut-out opening and allow synchronous movement of the cover member with the telescopic tube in response to the telescopic tube being moved between the retracted and extended conditions thereof; and an articulated connection between the cover member and the telescopic tube.

2. The aircraft wing according to claim 1, wherein the cover assembly further comprises a connection yoke which establishes the articulated connection between the cover member and the telescopic tube.

3. The aircraft wing according to claim 2, wherein connection yoke is a generally inverted U-shaped structure having a pair of downwardly and outwardly extending side arms and a central support plate.

4. The aircraft wing according to claim 3, wherein each of the side arms are fixed to a respective side portion of the telescopic tube, and the central support plate is connected to the cover member to allow rotational articulation about a generally vertical axis.

5. The aircraft wing according to claim 4, wherein the cover member comprises a connection bracket which includes a substantially horizontal oriented central connection boss, and wherein the connection yoke comprises a central bushing and pin assembly to operatively interconnect the central support plate to the central connection boss and thereby allow rotational articulation of the cover member about the generally vertical axis defined by the bushing and pin assembly.

6. The aircraft wing according to claim 5, wherein the connection bracket further includes a spaced apart pair of substantially vertically oriented lateral connection bosses, and wherein the connection yoke comprises a pair of lateral bushing and pin assemblies.

7. The aircraft wing according to claim 1, wherein the cover member is convexly curved and includes a pair of spaced apart pair of opposed side support plates.

8. The aircraft wing according to claim 7, wherein the cover assembly comprises at least one fixed position roller, and wherein the side support plates define at least one elongate channel to receive the at least one fixed position roller to allow the cover member to be moved forwardly upon movement of the telescopic tube from the retracted condition to the extended condition thereof.

9. The aircraft wing according to claim 8, wherein the cover assembly comprises a pair of fixed position rollers, and wherein each of the side support plates comprises a channel to receive therein a respective one of the rollers.

10. The aircraft wing according to claim 8, wherein the cover assembly further comprises a connection yoke which establishes articulated connection between the cover member and the telescopic tube.

11. The aircraft wing according to claim 10, wherein the connection yoke comprises a central support plate and a pair of side arms extending downwardly and outwardly from the central support plate, wherein each of the side arms are fixed to a respective side portion of the telescopic tube, and the central support plate is connected to the cover member to allow rotational articulation about a generally vertical axis.

12. The aircraft wing according to claim 11, wherein the cover member comprises a connection bracket which includes a substantially horizontal oriented central connection boss, and wherein the connection yoke comprises a central bushing and pin assembly to operatively interconnect the central support plate to the central connection boss and thereby allow rotational articulation of the cover member about the generally vertical axis defined by the bushing and pin assembly.

13. The aircraft wing according to claim 12, wherein the connection bracket further includes a spaced apart pair of substantially vertically oriented lateral connection bosses, and wherein the connection yoke comprises a pair of lateral bushing and pin assemblies.

14. The aircraft wing according to claim 10, wherein connection yoke is a generally inverted U-shaped structure having a pair of downwardly and outwardly extending side arms each fixed to a respective side of the telescopic tube, and a central support plate connected to the cover member to allow articulated movement of the cover member relative to the telescopic tube.

15. An aircraft which comprises the aircraft wing according to claim 1.

* * * * *